United States Patent
Familiant et al.

(10) Patent No.: US 8,850,237 B2
(45) Date of Patent: Sep. 30, 2014

(54) DATA PROCESSING SYSTEM POWER DISTRIBUTION USING UPS UNITS SELECTIVELY COUPLED TO LOADS BY RESERVE BUS BASED ON THE LOAD STATES

(75) Inventors: Yakov Lvovich Familiant, Brown Deer, WI (US); Luis Rafael Pereira, Menomonee Falls, WI (US); Kevin Lee, Menomonee Falls, WI (US); Michael P. Nowak, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 123 days.

(21) Appl. No.: 13/244,386

(22) Filed: Sep. 24, 2011

(65) Prior Publication Data
US 2013/0080793 A1   Mar. 28, 2013

(51) Int. Cl.
  *G06F 1/26*  (2006.01)
  *H02J 9/00*  (2006.01)
  *H02J 3/00*  (2006.01)
  *G06F 1/28*  (2006.01)

(52) U.S. Cl.
  CPC . *G06F 1/26* (2013.01); *H02J 9/005* (2013.01); *H02J 9/00* (2013.01); *H02J 3/005* (2013.01); *G06F 1/28* (2013.01)
  USPC ........................................................ 713/300

(58) Field of Classification Search
  CPC ............. G06F 1/18; G06F 1/189; G06F 1/28; G06F 1/26; H02J 3/005; H02J 9/00; H02J 9/005
  USPC ........................................................ 713/300
  See application file for complete search history.

(56) References Cited

U.S. PATENT DOCUMENTS

| | | | |
|---|---|---|---|
| 4,575,671 A | 3/1986 | Lee et al. | |
| 6,191,500 B1* | 2/2001 | Toy | ................ 307/64 |
| 6,268,665 B1 | 7/2001 | Bobry | |
| 6,784,634 B2 | 8/2004 | Sweo | |
| 7,038,923 B2 | 5/2006 | Zhou | |
| 2001/0022472 A1 | 9/2001 | Codina et al. | |
| 2003/0222507 A1 | 12/2003 | Deng | |
| 2005/0200205 A1 | 9/2005 | Winn et al. | |
| 2005/0229037 A1* | 10/2005 | Egan et al. | ................ 714/14 |
| 2006/0167569 A1* | 7/2006 | Colombi et al. | ................ 700/22 |
| 2006/0192434 A1* | 8/2006 | Vrla et al. | ................ 307/64 |
| 2006/0226706 A1* | 10/2006 | Edelen et al. | ................ 307/64 |
| 2009/0230772 A1 | 9/2009 | Caudill | |
| 2010/0264743 A1 | 10/2010 | Jung et al. | |
| 2011/0245988 A1* | 10/2011 | Ingels et al. | ................ 700/295 |

FOREIGN PATENT DOCUMENTS

KR          100973458          8/2010

* cited by examiner

*Primary Examiner* — Thomas Lee
*Assistant Examiner* — Danny Chan
(74) *Attorney, Agent, or Firm* — Myers Bigel Sibley & Sajovec

(57) ABSTRACT

Some embodiments of the inventive subject matter provide a power distribution system for a data processing system. The power distribution system includes a plurality of uninterruptible power supply (UPS) units, respective ones of which are configured to be coupled to respective loads via respective load busses, at least one reserve bus, a switching circuit configured to selectively couple and decouple the UPS units and the load busses to and from the at least one reserve bus and a control circuit configured to control the switching circuit responsive to a state of the data processing system. The control circuit may be configured to cause the switching circuit to couple the first UPS unit to the at least one reserve bus concurrent with the first UPS unit being coupled to a first load via a first load bus.

27 Claims, 9 Drawing Sheets

DATA PROCESSING SYSTEM POWER DISTRIBUTION USING UPS UNITS SELECTIVELY COUPLED TO LOADS BY RESERVE BUS BASED ON THE LOAD STATES

BACKGROUND

The inventive subject matter relates to power distribution systems and methods and, more particularly, to systems and methods for power distribution in data processing environments, such as data centers and telecommunications facilities.

Modern data centers often use virtual machines (VMs), wherein multiple "virtual" servers may operate on a given physical server. These VMs may be migrated across servers to facilitate, for example, maintenance and/or replacement of hardware. Data centers often employ VM consolidation, in which VMs are assigned to a reduced or minimized number of physical machines. VM consolidation may also be used to reduce overall energy consumption in the data center.

UPS systems are commonly used in data processing environments such as data centers, medical centers and industrial facilities. UPS systems may be used in such installations to provide backup power to maintain operation of electronic equipment in event of failure of the primary utility supply.

A data center power distribution system may have a structure along the lines illustrated in FIG. 9. The power distribution system includes an automatic transfer switch (ATS) 30 that is configured to receive power from an input utility source 10 and from a generator 20. Downstream from the ATS 30 is a UPS 40, which may be used to condition power received from the ATS 30 and to provide backup power from a battery or other energy storage device in the event of a loss of power from the ATS 30. The output of the UPS 40 is coupled to a power distribution unit (PDU) 60 that, in turn, distributes power to loads 70. The loads 70 may include, for example, equipment racks that house servers, routers and other data processing devices.

Generally, the battery or other backup source for the UPS 40 may be used to maintain power from the UPS 40 to the PDU 60 until the generator 20 has been activated and the ATS 30 operated to deliver power from the generator 20. A bypass switch 50 is operative to bypass the UPS 40, and may be used, for example, to maintain power to the PDU in the event of a failure of the UPS 40 or a deactivation of the UPS 40 for maintenance operations.

Data centers are commonly designed according to Tier specifications defined by the Uptime Institute (www.uptimeinstitute.org). These specifications generally require a power distribution system with significant redundancy. For example, Tier II data centers are equipped with redundant UPS systems, while Tier IV data centers require redundant input power lines with redundant UPS systems for each input power line. Statistics show, however, that even these highly redundant arrangements are vulnerable to catastrophic failures due to, for example, human error or equipment malfunctions.

SUMMARY

Some embodiments of the inventive subject matter provide a power distribution system for a data processing system. The power distribution system includes a plurality of uninterruptible power supply (UPS) units, respective ones of which are configured to be coupled to respective loads via respective load busses. The power distribution system also includes at least one reserve bus and a switching circuit configured to selectively couple and decouple the UPS units and the load busses to and from the at least one reserve bus. The power distribution system further includes a control circuit configured to control the switching circuit responsive to a state of the data processing system. The control circuit may be configured to cause the switching circuit to couple the first UPS unit to the at least one reserve bus concurrent with the first UPS unit being coupled to a first load via a first load bus.

In some embodiments, the control circuit may be configured to detect a status of a second UPS unit coupled to a second load via a second load bus and to responsively cause the switching circuit to couple the second load to the at least one reserve bus responsive to the detected status. The control circuit may be further configured to decouple the second UPS unit from the second load responsive to the detected status. The control circuit may also be configured to conduct a diagnostic test of the decoupled second UPS unit. In some embodiments, the detected status of the second UPS unit may include a failure and/or a capacity deficit of the second UPS unit.

In further embodiments, the control circuit may be configured to select a UPS unit as a reserve unit responsive to the state of the data processing system and to couple the selected UPS unit to the at least one reserve bus. The state of the data processing system may include a data processing state and/or an operational state of at least one of the plurality of UPS units. The operational state of at least one of the UPS units may include, for example, a capacity of the at least one of the UPS units and/or a maintenance status of the at least one of the UPS units. The data processing state may include a distribution of computing processes.

In some embodiments, the control circuit may be configured to select a first UPS unit as a reserve unit and to couple the selected first unit to the at least one reserve bus responsive to a first state of the data processing system. The control circuit may be further configured to select a second UPS unit as a reserve unit and to couple the selected second unit to the at least one reserve bus responsive to a second state of the data processing system.

In some embodiments, the switching circuit may include a plurality of static switches, respective ones of which are configured to couple respective ones of the loads to the at least one reserve bus. The static switches may be integrated with the UPS units.

According to additional embodiments, a power distribution system includes a fabric configured to couple any of a plurality of UPS units to any of a plurality of data processing devices and a control circuit operatively coupled to the fabric and configured to operate the fabric to use an excess capacity of an active one of the UPS units as a reserve power supply capacity for the plurality of data processing devices. The control circuit may be configured to operate the fabric to configure the active one of the UPS units as a reserve power supply for the plurality of data processing devices. The control circuit may be configured to operate the fabric to configure the active one of the UPS units as a reserve power supply responsive to a distribution of computing processes among the data processing devices.

In some embodiments, the control circuit may be configured to cause the designated UPS unit to provide power to a first computing device and to provide power in reserve to a second computing device in response to a failure of a UPS unit associated with the second computing device.

In some embodiments, the fabric may include at least one reserve bus and a plurality of switches configured to couple the data processing devices and the UPS units to the at least one reserve bus.

According to further embodiments, the control circuit may be configured to operate the fabric to provide the reserve power supply capacity to a load associated with a failed UPS unit. In some embodiments, the control circuit may be configured to operate the fabric to provide the reserve power supply capacity to a load associated with a UPS unit taken off line for diagnostic testing.

Further embodiments provide power distribution methods for a data processing system. Respective ones of a plurality of uninterruptible power supply (UPS) units are coupled to respective loads via respective load busses. The UPS units and the load busses are selectively coupled and decoupled to and from at least one reserve bus responsive to a state of the data processing system. Selectively coupling and decoupling the UPS units and the load busses to and from at least one reserve bus responsive to a state of the data processing system may include coupling a first UPS unit to the at least one reserve bus concurrent with the first UPS unit being coupled to a first load via a first load bus. Selectively coupling and decoupling the UPS units and the load busses to and from at least one reserve bus responsive to a state of the data processing system may further include detecting a status of a second UPS unit coupled to a second load via a second load bus and coupling the second load to the at least one reserve bus responsive to the detected status. Selectively coupling and decoupling the UPS units and the load busses to and from at least one reserve bus responsive to a state of the data processing system may further include decoupling the second UPS unit from the second load responsive to the detected status.

DETAILED DESCRIPTION OF EXEMPLARY EMBODIMENTS

Figure 1:
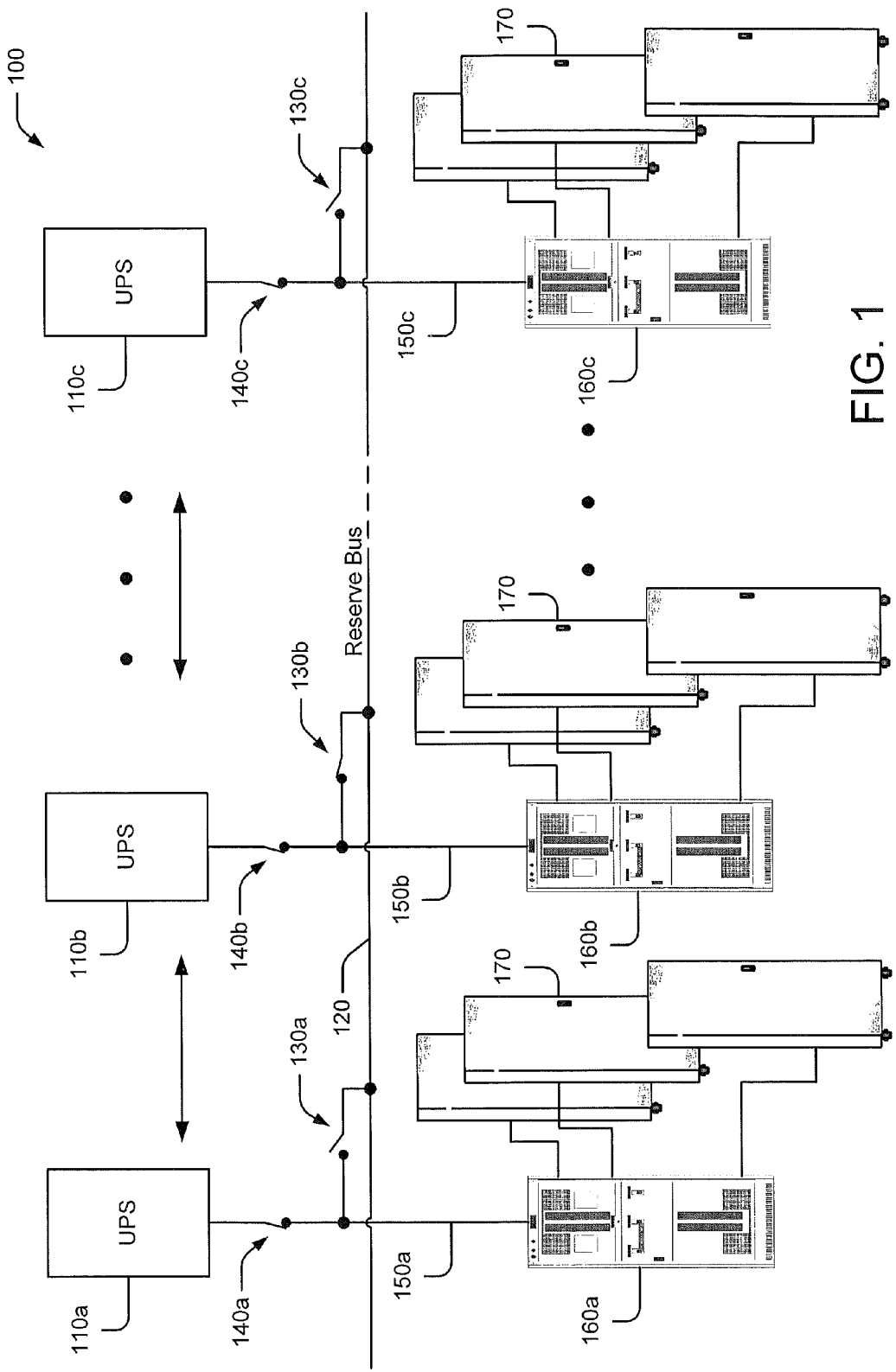
FIGS. 1 and 2 are schematic diagrams illustrating a power distribution system and operations thereof according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that conventional fixed power distribution arrangements used in data centers, telecommunications facilities and other data processing systems may limit reliability and resource utilization. Problems associated with use of such a fixed power infrastructure may be exacerbated by certain management techniques, such as VM consolidation, that redistribute loads in manner that may reduce utility and availability of the power distribution system. In particular, VM consolidation may concentrate power consumption in a subset of the available UPSs, which may strain the capacity and reduce the reliability of these UPSs, while other UPSs go underutilized.

Some embodiments of the inventive subject matter incorporate a plurality of UPS units, each of which is configured to serve a respective load, for example, a PDU that supplies power to a group of data processing devices. One or more reserve busses (e.g., single phase or three phase busses) are provided, with respective switches (e.g., relatively high-speed static switches, such as semiconductor static switches) configured to selectively couple individual ones of the UPS units and their associated loads to the one or more reserve busses. Based on a state of the data center, such as a distribution of computing processes among loads served by the power distribution system and/or a status (e.g., capacity, failure status, maintenance status, etc.) of one or more of the UPS units, excess capacity of a selected UPS unit serving its own individual load may also be designated as a reserve for other ones of the UPS units. This reserve UPS unit may be coupled to a reserve bus so that the reserve bus is energized. Upon failure or other unavailability of another of the UPS units, the load associated therewith may be transferred to the energized reserve bus such that the load of the unavailable UPS unit may be served by the reserve UPS unit. In this manner, power distribution resources may be more flexibly and reliably provided to adapt to resource management actions, such as VM consolidation. Some embodiments of the inventive subject matter may also support UPS maintenance procedures with reduced risk of interrupting data processing operations.

FIG. 1 illustrates a power distribution system 100 for a data processing system, such as a data center (e.g., server farm) or telecommunications facility, according to some embodiments of the inventive subject matter. The power distribution system includes three or more UPS units 110a, 110b, ..., 110c, which are configured to be coupled to respective load busses 150a, 150b, ..., 150c. The load busses 150a, 150b, ..., 150c may, for example, be coupled to respective PDUs 160a, 160b, ..., 160c that serve a plurality of data processing loads 170 (e.g., server racks or other electronic devices). First switches 140a, 140b, ..., 140c are operative to couple and decouple the respective UPS units 110a, 110b, ..., 110c to and from the load busses 150a, 150b, ..., 150c.

It will be appreciated that the UPS units 110a, 110b, ..., 110c may take any of a number of different forms. For example, the UPS units 110a, 110b, ..., 110c may include, for example, on-line UPS units and/or line-interactive (line-adaptive) UPS units. The various UPS units 110a, 110b, ..., 110c also may have different capacities and/or operational characteristics. For example, one or more of the UPS units 110a, 110b, ..., 110c may have a modular structure including a plurality of parallel-connectable modules, while others of the UPS units 110a, 110b, ..., 110c may be unitary, non-modular units. Although the power distribution system 100 illustrated utilizes PDU's to distribute power to loads 170 via various branch circuits, it will be appreciated that some loads may be coupled to one or more of the UPS units 110a, 110b, ..., 110c directly and/or via other intervening power distribution components, such as switchgear, additional power distribution units and/or transformers.

The power distribution system 100 further includes a reserve bus 120 that may be used to selectively provide reserve capacity across the system. Respective second switches 130a, 130b, ..., 130c are configured to couple the reserve bus 120 to respective ones of the load busses 150a, 150b, ..., 150c. According to various embodiments of the inventive subject matter, one of the UPS units, such as the UPS unit 110b, may be designated as a reserve UPS unit and coupled to the reserve bus 120 by closing the associated second switch 130b, thus enabling the selected UPS unit 110b to energize the reserve bus 120 while continuing to serve its associated load bus 150b.

Figure 2:
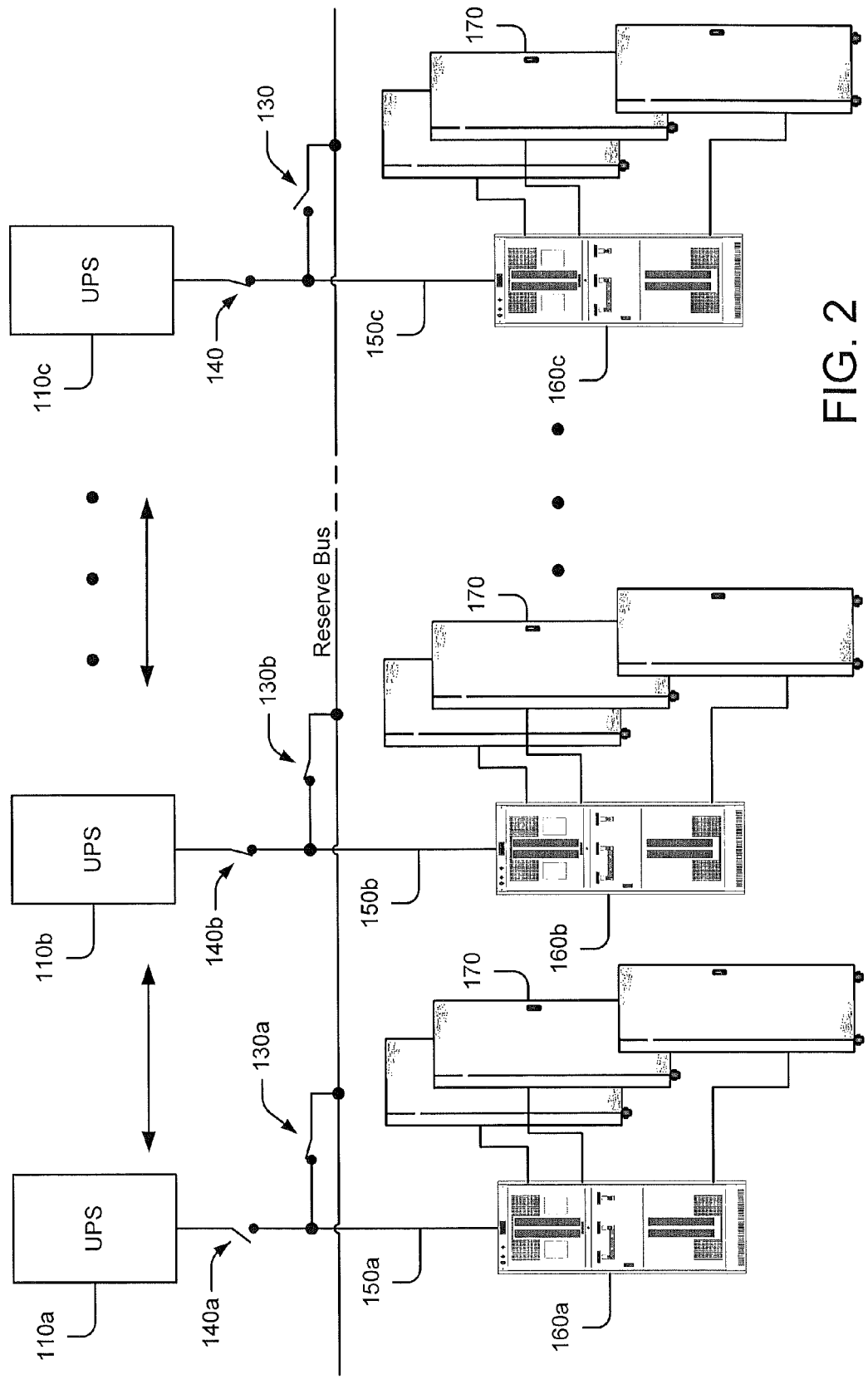

In this manner, the selected UPS unit 110b and the reserve bus 120 may provide a ready or "spinning" reserve for the other UPS units. As shown in FIG. 2, upon failure or other event that necessitates deactivation of another UPS unit 110a serving a load bus 150a, its associated second switch 130a may be closed to allow the reserve UPS 110b to be coupled to the load bus 150a via the pre-energized reserve bus 120. The first switch 140a of the UPS unit 110a may be opened to decouple the UPS unit 110a from the load bus 150a, thus facilitating maintenance or other actions on the affected UPS unit 110a.

Such an arrangement may be viewed as providing a power distribution "fabric." As used herein, a "power distribution fabric" may include an arrangement of conductors that may be flexibly interconnected using, for example, switching devices. For example, a power distribution fabric may include one or more reserve busses and load busses and components, such as static switches or other devices, configured to flexibly interconnect these busses. In the illustrated embodiments, for example, a power distribution fabric is provided wherein any one of the UPS units 110a, 110b, ..., 110c may be used to supply any one of the load busses 150a, 150b, ..., 150c. It will be understood that the fabric may be constrained such that the reserve bus 120 need not support fully paralleled operation of all of the UPS units 110a, 110b, ..., 110c. In particular, in typical practical applications, the likelihood of concurrent failure of multiple UPS units is relatively small, and therefore the fabric may need only to be able to respond to a failure of a single UPS unit or a relatively limited number of UPS units. Accordingly, the reserve bus 120 may have a relatively low capacity, and material and installation costs associated with provision of the reserve bus 120 and associated components may be kept to a reasonable level.

It will be further appreciated that the above-described operations may be varied within the scope of the inventive subject matter. For example, connection of the reserve UPS unit to the reserve bus 120 may be delayed until needed, e.g., until another UPS unit indicates it is going offline. It may be more advantageous to energize the reserve bus 120 with the reserve UPS unit before such an event happens, however, as it may be difficult to coordinate multiple switch operations and multiple switch operations may introduce undesirable delays in transferring the load from a failed UPS unit to the reserve UPS unit.

As discussed in greater detail below, a reserve UPS unit may generally be designated based on a state of the data processing system, including the power distribution system 100. For example, a UPS unit may be designated as a reserve unit based on consideration of a current and/or prospective (e.g., predicted or scheduled) distribution of data processing operations among the loads 170. For example, in a data center employing VM consolidation techniques, a UPS unit having no or reduced VM activity on its associated loads 170 may be chosen as a reserve UPS unit, as it may have relatively more excess capacity to utilize in the event of a failure by a UPS serving a load having a larger share of VM activity. A reserve UPS unit may also be selected based on the status of the UPS units themselves. For example, a UPS unit with a larger total capacity and/or greater battery reserve may be selected. Other measures, such as measures of relatively likelihood of UPS unit failure, may also be used in identifying an appropriate reserve unit.

As shown in FIGS. 1 and 2, the UPS units 110a, 110b, ..., 110c may communicate with one another to determine which unit to designate as a reserve unit and to perform other operations associated with operation of the power distribution system 100. For example, the UPS units 110a, 110b, ..., 110c may be linked by a data communications bus that supports peer-to-peer communication among the UPS units 110a, 110b, ..., 110c, such as a controller area network (CAN) bus. In some embodiments, UPS units 110a, 110b, ..., 110c may communicate with a separate master controller that provides similar functionality. The first switches 140a, 140b, ,..., 140c and/or the second switches 130a, 130b, ..., 130c may be integrated with the UPS units 110a, 110b, 110c and/or may be physically separate units.

Figure 3:
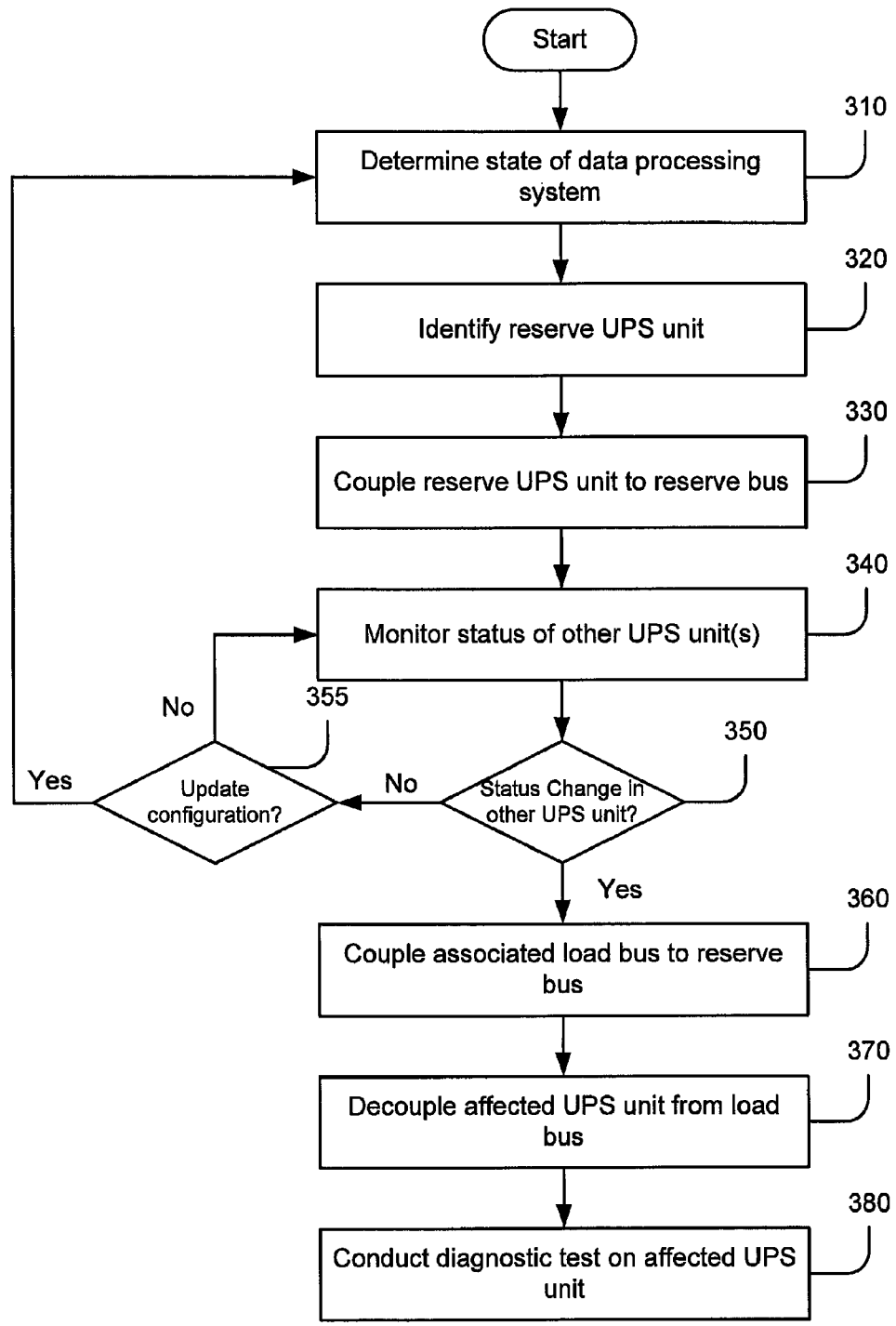
FIG. 3 is a flowchart illustrating operations of the power distribution system of FIGS. 1 and 2.

FIG. 3 illustrates an example of operations of the power distribution system 100 of FIGS. 1 and 2 according to some embodiments. A state of the data processing system is identified (block 310). For example, in the embodiments of FIGS. 1 and 2, this may involve determining a current and/or prospective distribution of processes (e.g., VMs) across the loads and/or a status of the various UPS units. Based on the determined state, a reserve UPS unit is identified (block 320). This unit may be, for example, a UPS unit having an associated load with the least data processing activity and/or a UPS unit having the greatest excess capacity. The identified reserve UPS unit is coupled to the reserve bus to energize the reserve bus (block 330).

Subsequently, status of the other UPS units is monitored (block 340). This monitoring may be performed independently in each of the UPS units and/or may be performed by an external controller in communication with the UPS units. If no relevant change in status of the UPS units is detected and there is no need for a re-designation of a reserve UPS unit (blocks 350, 355), the monitoring of the UPS units continues.

Alternatively, if a reconfiguration of the reserve is required, the state of the data center may be re-evaluated and a new reserve UPS unit designated (blocks 355, 310-330). It will be appreciated that re-designation of a reserve UPS unit may be governed by several factors, including, but not limited, periodic scheduled events and/or a change in status of the current reserve UPS unit. For example, if an imminent failure or increased loading of the current reserve UPS unit is detected, a process for selecting a new reserve UPS unit may be initiated.

Still referring to FIG. 3, if a change in status of one of the non-reserve UPS units is detected (block 350), the load bus associated therewith is coupled to the reserve bus (block 360) and the affected UPS unit is decoupled from its load (block 370). This may facilitate test, maintenance, replacement and/or other actions. For example, after decoupling, diagnostic testing may be performed on the affected UPS unit (block 380).

Figure 4:
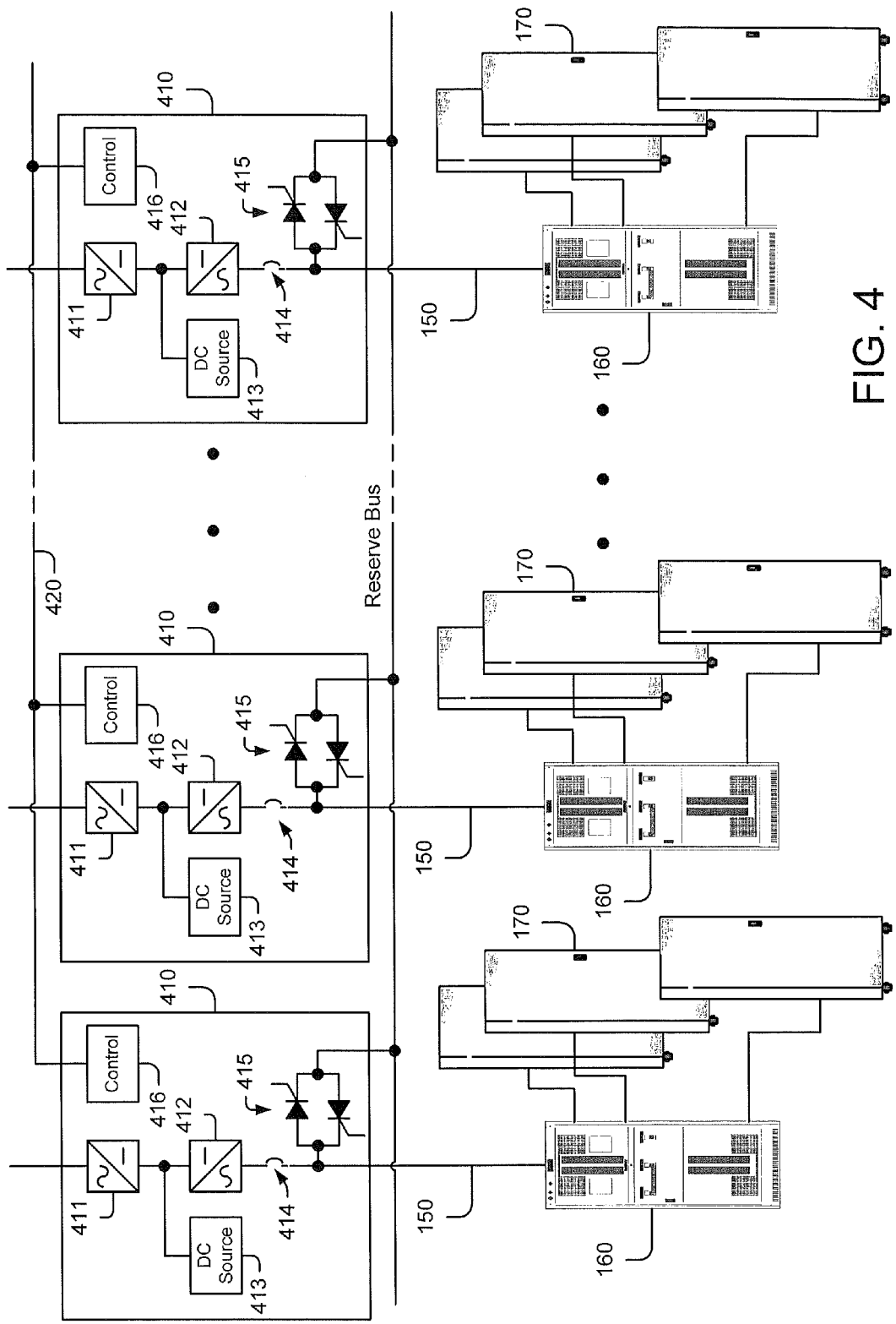
FIG. 4 is a schematic diagram illustrating a power distribution system and operations thereof according to further embodiments of the inventive subject matter.

FIG. 4 illustrates a power distribution system 400 for a data center, telecommunications facility or other data processing system according to further embodiments. The power distribution system 400 includes a plurality of on-line UPS units 410. Each of the UPS units 410 includes a rectifier 411 and an inverter 412 coupled by a DC bus, which is also coupled to an auxiliary DC source 413 (e.g., a battery, fuel cell or the like). A contactor 414 is configured to couple and decouple the output of the inverter 412 to and from a PDU 160 via a load bus 150. Various data processing loads 170 are coupled to the PDU 160. Each UPS unit 410 further includes an integrated static switch 415 that is configured to couple and decouple the UPS unit 410 to and from a reserve bus 120. A control circuit 416 may control operations of the rectifier 411, the inverter 412 and the static switch 415.

Each UPS unit 410 may also have an associated bypass, for example, another static switch that bypasses the rectifier 411 and inverter 412. Such a bypass may be integrated with the UPS unit 410 and/or separate from the UPS unit 410. Operation of such a bypass may be coordinated with operation of the reserve bus static switch 415 such that, for example, the bypass could be used to temporarily provide power to the reserve bus 420 under certain failure conditions, such as a failure of a UPS unit 410 that is operating as a reserve.

Figure 5:
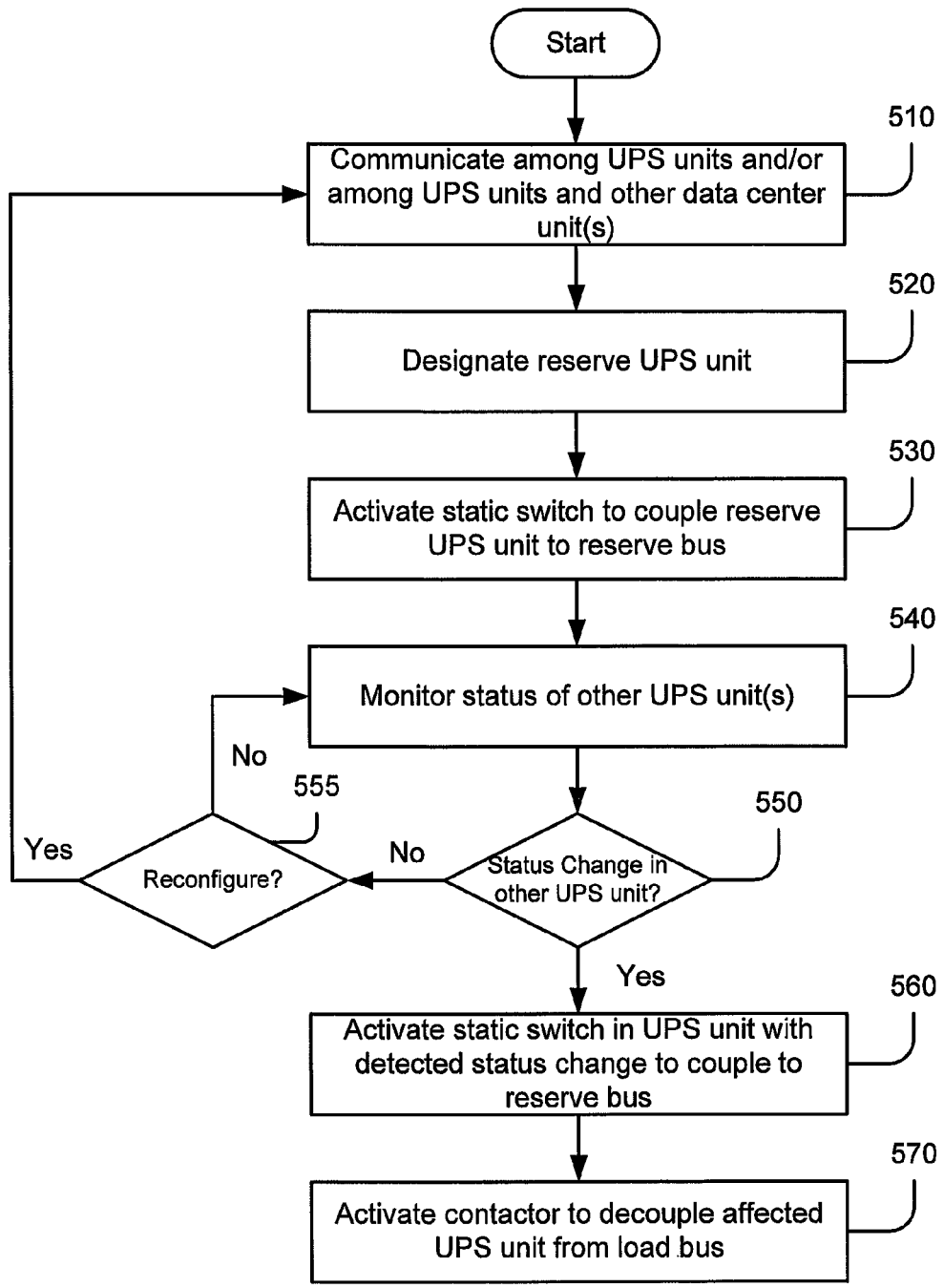
FIG. 5 is a flowchart illustrating operations of the power distribution system of FIG. 4.

FIG. 5 illustrates an example of operations of the power distribution system of FIG. 4. Communications occur between the various UPS units and/or between the UPS units and other devices, such as components of the data processing system that monitor and/or control the UPS units (block 510). These communications generally may include status information pertaining to the UPS units and/or the loads coupled thereto, such as information pertaining to the various data processing operations occurring on the loads. Based on these communications, one of the UPS units is designated to be a reserve unit (block 520), and its associated static switch is operated to allow the designated reserve UPS unit to energize the reserve bus (block 530).

Status of the other UPS units is monitored (block 540). In no relevant change is detected (block 560), the power distribution system continues to monitor until such time as a re-designation of a reserve unit may be needed (blocks 550, 555, 510-530). If a change in status of one of the non-reserve units is detected, indicating, for example, a current or imminent failure, its associated static switch is operated to couple its associated load to the reserve bus (block 560). The output contactor of the failed or failing UPS unit may then be operated to decouple the failed unit from the load (block 570). As explained above, diagnostic tests and/or other operations may then be performed on the decoupled unit.

Figure 6:
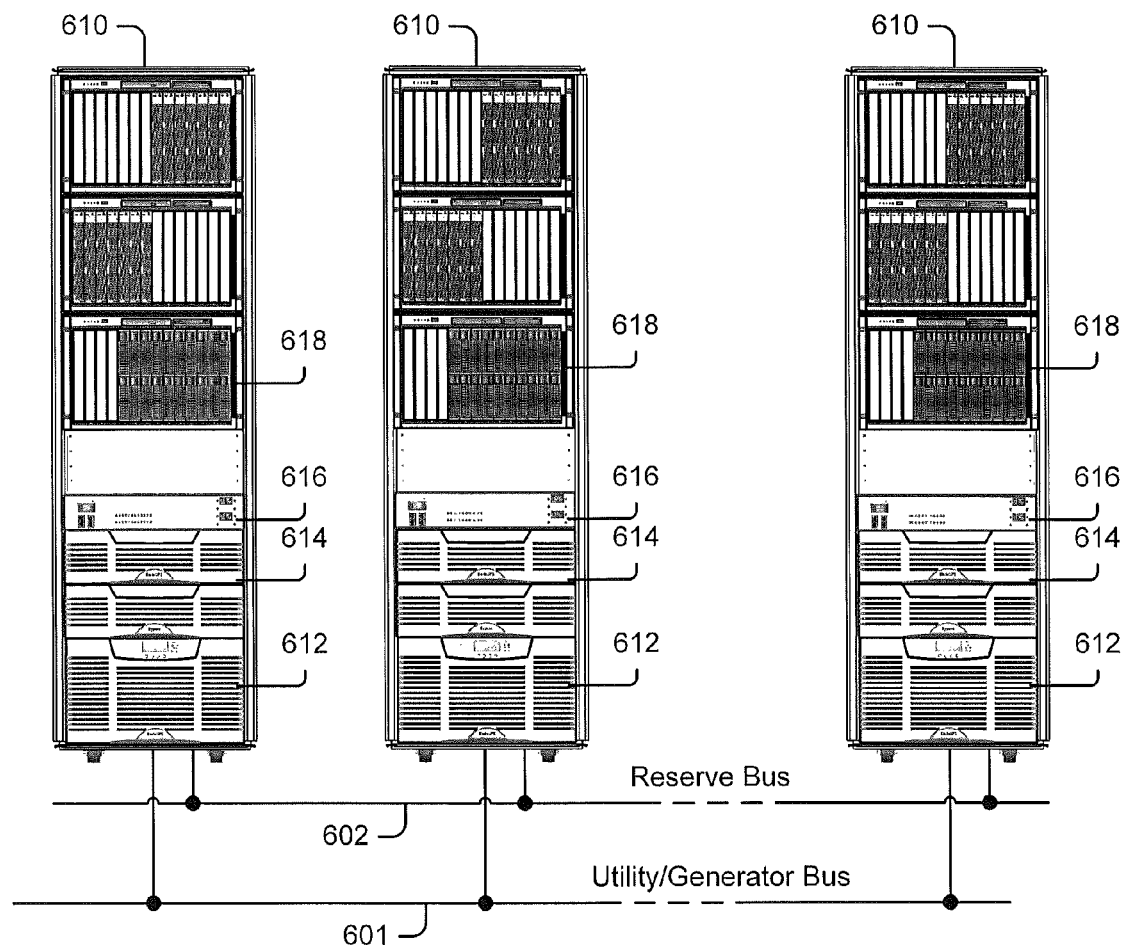
FIG. 6 is a schematic diagram illustrating a power distribution system and operations thereof according to some embodiments of the inventive subject matter.

The inventive subject matter is applicable to a wide variety of data processing system configurations. For example, as illustrated in FIG. 6, a power distribution for a data center may include a plurality of rack-mount UPS units 612 that are configured to be mounted in equipment racks 610 along with an associated battery unit 614, PDUs 616 and rack-mounted data processing equipment 618, such as servers, routers, disk storage devices and the like. The UPS units 612 may be coupled to a primary bus 601 that is powered, for example, from a utility source or a generator via an ATS, The UPS units 612 may also be configured to be coupled to a reserve bus 602 using a static switch integrated in the UPS unit 612 or in the rack 610, or positioned in a unit separate from the rack 610.

Figure 7:
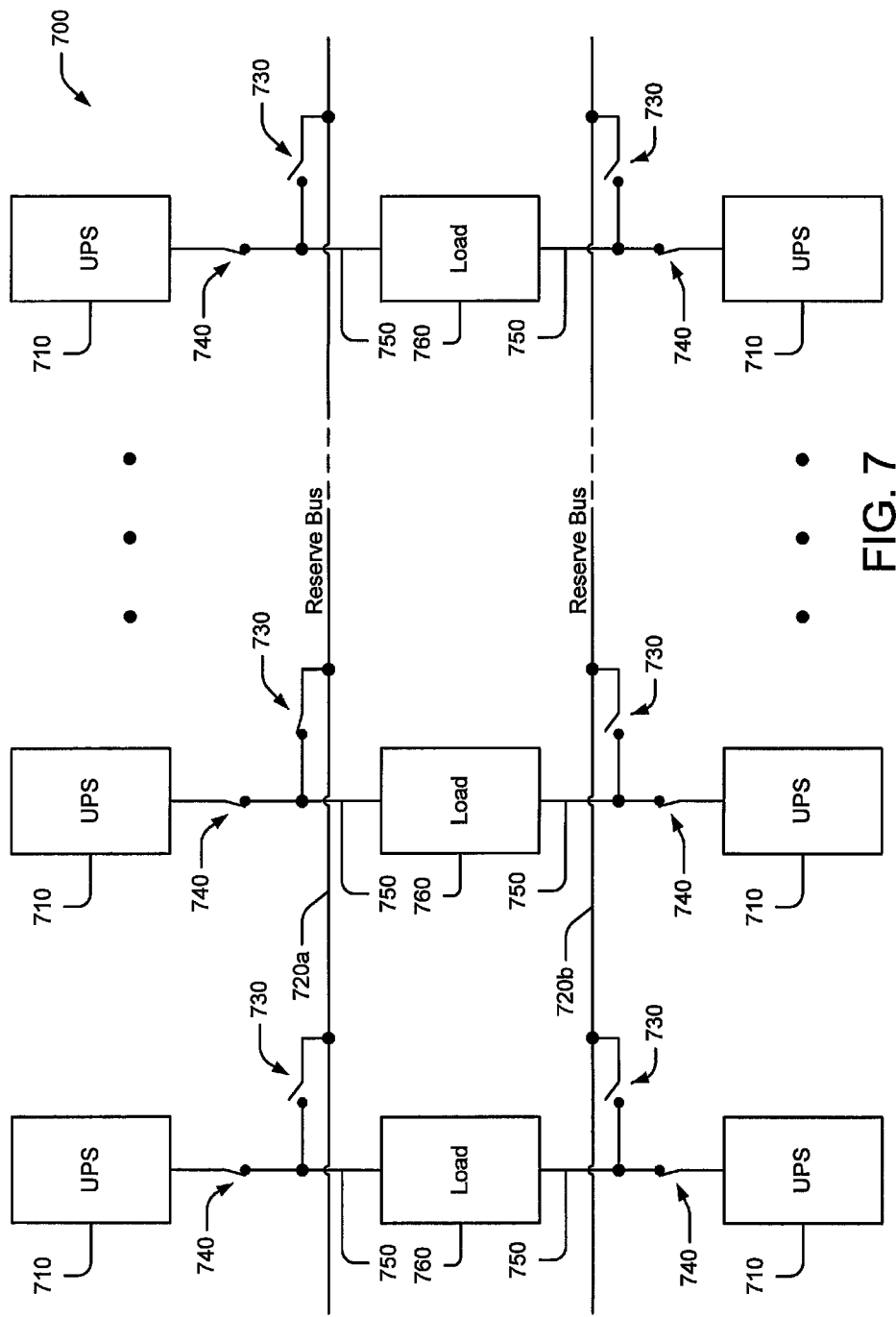
FIG. 7 is a schematic diagram illustrating a power distribution system and operations thereof according to further embodiments of the inventive subject matter.

Similar functionality may be provided in data processing systems, such as Tier IV data centers, having redundant input power busses. Referring to FIG. 7, such a power distribution system 700 may include first and second groups of UPS units 710, with pairs of the UPS units 110 being configured to be coupled via switches 740 to redundant load busses 750 that serve loads 760. The power distribution system 700 may include first and second reserve busses 720a, 720b, to which the UPS units 710 from the respective redundant groups may be coupled via switches 730. These reserve busses 720a, 720b may be used in a manner similar to that described above with reference to FIGS. 1-5.

According to further embodiments, power distribution systems and methods along the lines discussed above may be used to support maintenance and/or test procedures. Data center outages are commonly caused by UPS battery failures and exceeding UPS battery capacity, which may decrease as batteries age. For these and other reasons, it is generally desirable to monitor health and capacity of UPS batteries. Using techniques along the lines discussed above, battery and other UPS diagnostic tests may be conducted by taking advantage of reserve UPS capacity. Such techniques may also be used in combination with other data center management techniques, such as VM consolidation, that enable control of load distribution across the data center.

Figure 8:
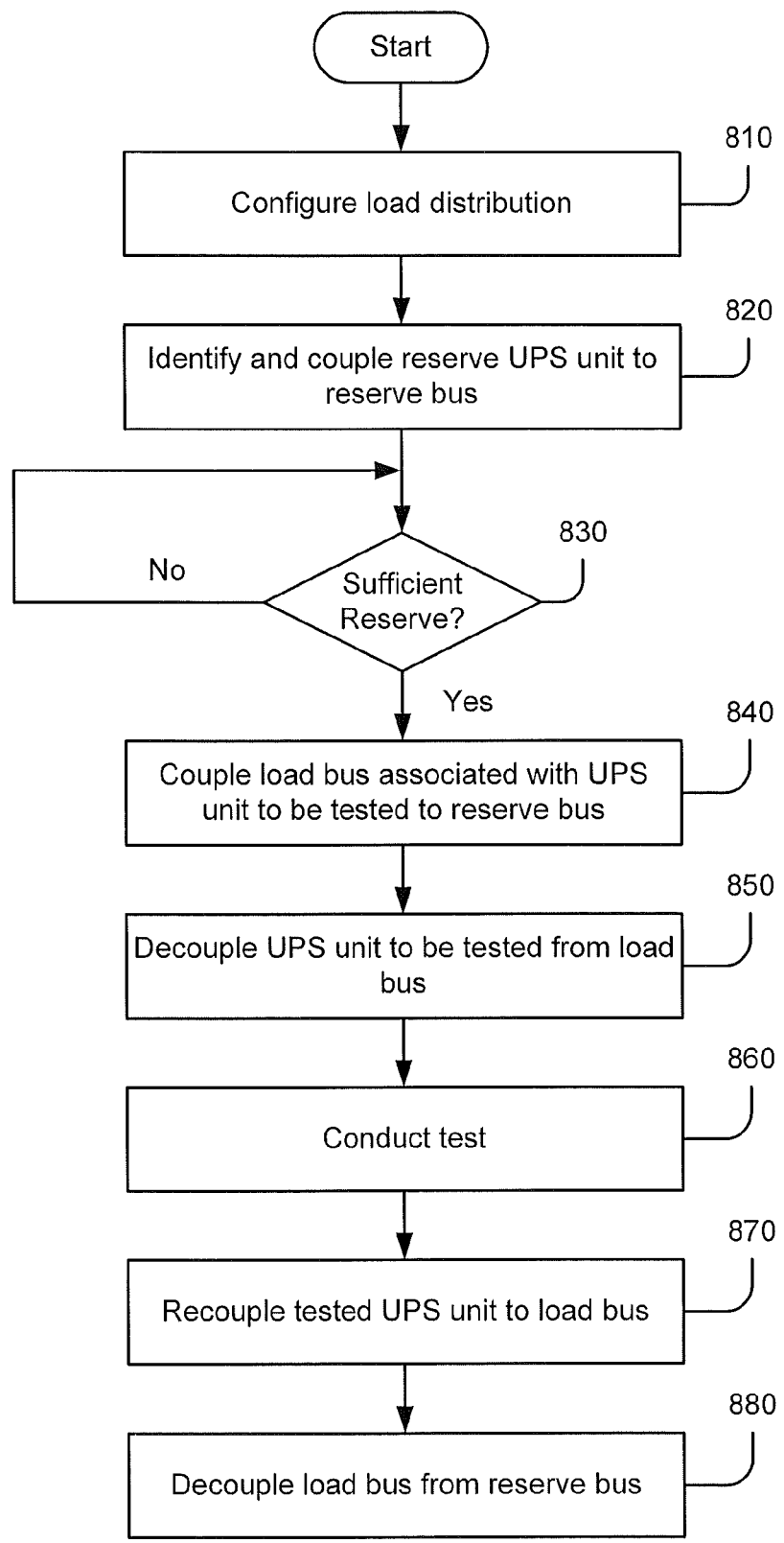
FIG. 8 is a flowchart illustrating operations of a power distribution system according to some embodiments of the inventive subject matter.
Figure 9:
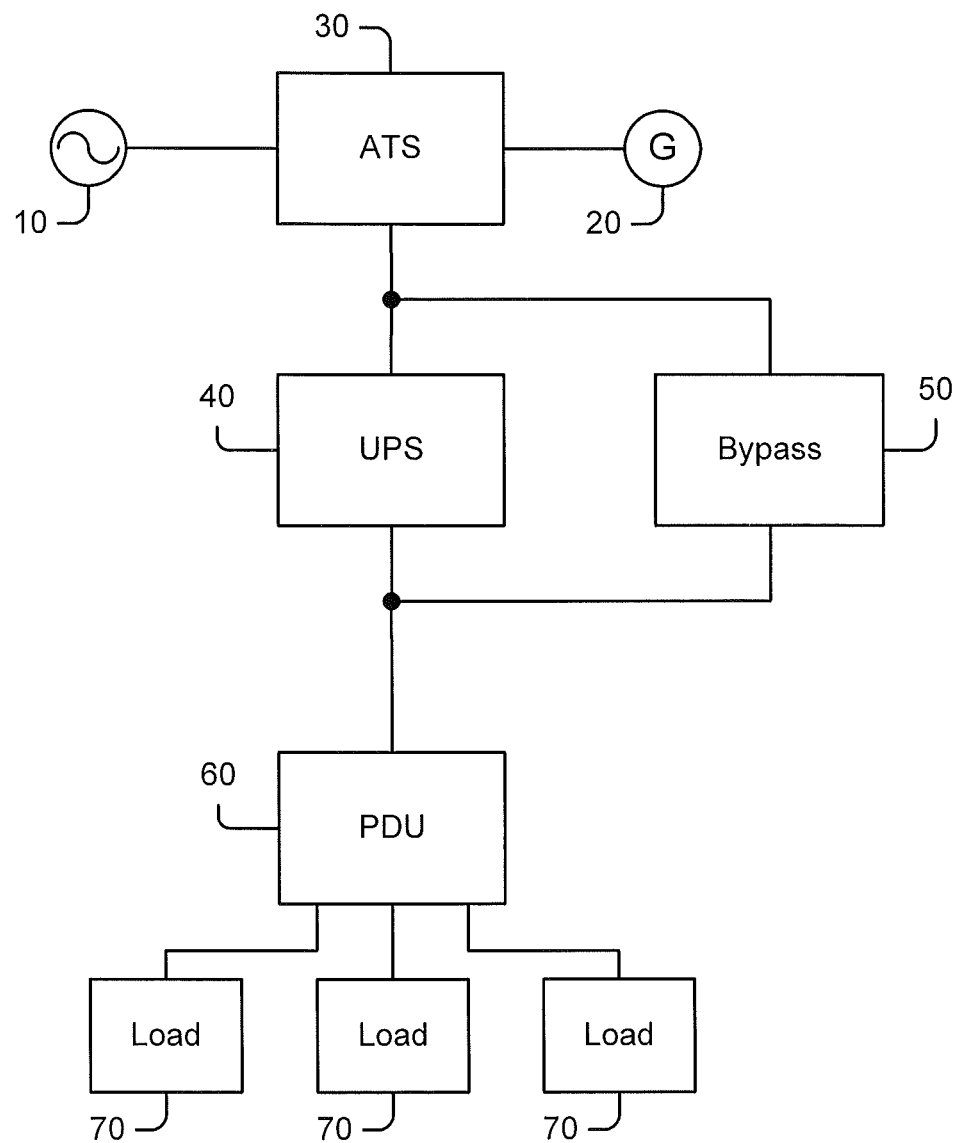
FIG. 9 is a schematic diagram illustrating a conventional power distribution system for a data center.

For example, referring to FIG. 8, a load distribution may be established that supports UPS testing using, for example, VM consolidation or other data center management techniques (block 810). Such a distribution may, for example, reduce a load on a particular UPS unit that is to be tested. It will be understood that this distribution may be purposely generated as part of a test preparation process and/or may be a distribution that is created for other reasons, such as VM consolidation, but that has characteristics making it suitable for taking a selected UPS unit offline for testing.

After creating a desired load distribution, a reserve UPS unit may be identified and coupled to a reserve bus (block 820). The selected reserve UPS unit may be, for example, a UPS unit that is relatively lightly loaded due to the distribution of computing processes in the data center, such that it has sufficient capacity to support taking the unit to be tested offline while still providing sufficient capacity to provide reserve should any of the other UPS units fail during the test.

If it is determined that sufficient reserve capacity is present to take the unit to be tested offline (block 830), the load bus currently coupled to the unit to be tested is connected to the reserve bus (block 840), and the unit to be tested is decoupled from its load (block 850). If a time for a scheduled test of a currently active non-reserve UPS unit arrives (block 820), and sufficient reserve capacity is present (block 830), a load associated with the UPS unit to be tested is coupled to the reserve bus so that the load can continue operations powered from the reserve UPS unit (block 840). The unit to be tested can then be decoupled from the load (block 850) and the scheduled test conducted (block 860). Subsequent to the test, the tested UPS unit may be recoupled to its load (block 870) and the reserve bus decoupled from the load (block 880).

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A power distribution system for a data processing system, the power distribution system comprising:
   a plurality of uninterruptible power supply (UPS) units, respective ones of which are configured to be coupled to respective loads via respective load busses;
   at least one reserve bus;
   a plurality of switches, respective ones of which are configured to selectively couple and decouple the respective load busses to and from the at least one reserve bus such that each of the UPS units can provide power to the at least one reserve bus; and
   a control circuit configured to control the switches responsive to a state of the data processing system.

2. The power distribution system of claim 1, wherein the control circuit is configured to cause a first one of the switches to couple a first UPS unit to the at least one reserve bus concurrent with the first UPS unit being coupled to a first load via a first load bus and a second UPS unit being coupled to a second load via a second load bus such that the at least one reserve bus is energized by the first UPS unit without connection of the reserve bus to a load bus other than the first load bus.

3. The power distribution system of claim 2, wherein the control circuit is further configured to detect a status of the second UPS unit and to responsively cause a second one of the switches to couple the second load to the at least one reserve bus responsive to the detected status.

4. The power distribution system of claim 3, wherein the control circuit is further configured to decouple the second UPS unit from the second load responsive to the detected status.

5. The power distribution system of claim 4, wherein the control circuit is further configured to conduct a diagnostic test of the decoupled second UPS unit.

6. The power distribution system of claim 5, wherein the detected status of the second UPS unit comprises a failure and/or a capacity deficit of the second UPS unit.

7. The power distribution system of claim 1, wherein the control circuit is configured to select a first UPS unit as a reserve unit responsive to the state of the data processing system and to couple a first load bus coupled to the selected first UPS unit to the at least one reserve bus such that the at least one reserve bus is energized by the selected first UPS unit without connection of the reserve bus to a load buss other than the first load bus.

8. The power distribution system of claim 7, wherein the state of the data processing system comprises a data processing state and/or an operational state of at least one of the plurality of UPS units.

9. The power distribution system of claim 8, wherein the operational state of at least one of the UPS units comprises a capacity of the at least one of the UPS units and/or a maintenance status of the at least one of the UPS units.

10. The power distribution system of claim 1, wherein the data processing state comprises a distribution of computing processes.

11. The power distribution system of claim 7, wherein the control circuit is configured to select the first UPS unit as a reserve unit and to couple the selected first unit to the at least one reserve bus responsive to a first state of the data processing system and wherein the control circuit is further configured to select a second UPS unit as a reserve unit and to couple the selected second unit to the at least one reserve bus responsive to a second state of the data processing system.

12. The power distribution system of claim 1, wherein the plurality of switches comprises a plurality of static switches, respective ones of which are configured to couple respective ones of the loads to the at least one reserve bus.

13. The power distribution system of claim 12, wherein the static switches are integrated with the UPS units.

14. The power distribution system of claim 1, wherein the control circuit is configured to control the switches responsive to a distribution of computing processes among computing devices coupled to the load busses.

15. A power distribution system comprising:
   a fabric configured to couple any of a plurality of UPS units to any of a plurality of data processing devices, the fabric comprising:
      at least one reserve bus; and
      a plurality of switches, respective ones of which are configured to couple and decouple the data processing devices to and from the at least one reserve bus such that each of the UPS units can provide power to the at least one reserve bus; and
   a control circuit operatively coupled to the fabric and configured to operate the fabric to use an excess capacity of an active one of the UPS units as a reserve power supply capacity for the plurality of data processing devices.

16. The power distribution system of claim 15, wherein the control circuit is configured to operate the fabric to configure the active one of the UPS units as a reserve power supply responsive to a distribution of computing processes among the data processing devices.

17. The power distribution system of claim 15, wherein the control circuit is configured to cause the designated UPS unit to provide power to a first computing device and to provide power in reserve to a second computing device in response to a failure of a UPS unit associated with the second computing device.

18. The power distribution system of claim 15, wherein the control circuit is configured to operate the fabric to provide the reserve power supply capacity to a load associated with a failed UPS unit.

19. The power distribution system of claim 15, wherein the control circuit is configured to operate the fabric to provide the reserve power supply capacity to a load associated with a UPS unit taken off line for diagnostic testing.

20. A power distribution method for a data processing system, the method comprising:
   coupling respective ones of a plurality of uninterruptible power supply (UPS) units to respective loads via respective load busses; and selectively coupling and decoupling the load busses to and from at least one reserve bus using respective switches responsive to a state of the data processing system to selectively provide power to the at least one reserve bus from the UPS units.

21. The method of claim 20, wherein selectively coupling and decoupling the UPS units and the load busses to and from at least one reserve bus responsive to a state of the data processing system comprises coupling a first UPS unit to the at least one reserve bus concurrent with the first UPS unit being coupled to a first load via a first load bus and a second UPS unit being coupled to a second load via a second load bus such that the at least one reserve bus is energized by the selected first UPS unit without connection of the reserve bus to a load bus other than the first load bus.

22. The method of claim 21, wherein selectively coupling and decoupling the UPS units and the load busses to and from at least one reserve bus responsive to a state of the data processing system further comprises detecting a status of the second UPS unit and coupling the second load to the at least one reserve bus responsive to the detected status.

23. The method of claim 22, wherein selectively coupling and decoupling the UPS units and the load busses to and from at least one reserve bus responsive to a state of the data processing system further comprises decoupling the second UPS unit from the second load responsive to the detected status.

24. The method of claim 23, further comprising conducting a diagnostic test of the decoupled second UPS unit.

25. The method of claim 20, further comprising:
 selecting a UPS unit as a reserve unit responsive to the state of the data processing system; and
 coupling the selected UPS unit to the at least one reserve bus.

26. The method of claim 25, wherein the state of the data processing system comprises a data processing state and/or an operational state of at least one of the plurality of UPS units.

27. The method of claim 20, wherein selectively coupling and decoupling the load busses to and from at least one reserve bus using respective switches responsive to a state of the data processing system comprises selectively coupling and decoupling the load busses to and from at least one reserve bus based on a distribution of computing processes among computing devices coupled to the load busses.

\* \* \* \* \*